Figure 1:
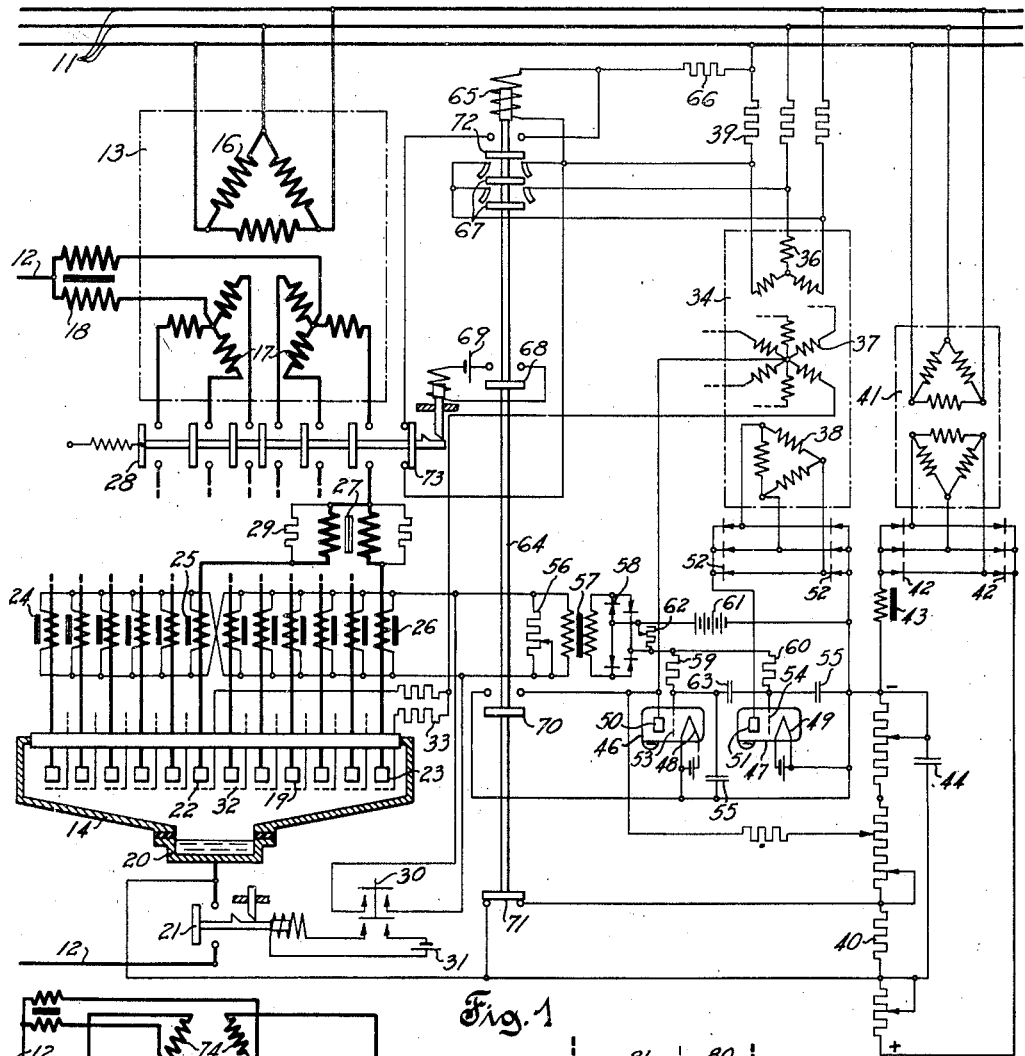

Dec. 9, 1941. H. WINOGRAD 2,265,591
ELECTRIC VALVE PROTECTIVE SYSTEM
Filed May 17, 1940 3 Sheets-Sheet 1

Inventor
H. Winograd
by
Attorney

Dec. 9, 1941.   H. WINOGRAD   2,265,591
ELECTRIC VALVE PROTECTIVE SYSTEM
Filed May 17, 1940   3 Sheets-Sheet 2

Inventor
H. Winograd
by
Attorney

Inventor
H. Winograd
by G. F. Elkin
Attorney

Patented Dec. 9, 1941

2,265,591

UNITED STATES PATENT OFFICE 2,265,591

ELECTRIC VALVE PROTECTIVE SYSTEM

Harold Winograd, Milwaukee, Wis., assignor to Allis-Chalmers Manufacturing Company, Milwaukee, Wis., a corporation of Delaware Application May 17, 1940, Serial No. 335,665

19 Claims. (Cl. 175—363)

This invention relates in general to improvements in electric valve protective systems, and more particularly to means for interrupting the flow of current through a group of electric valves within the shortest possible time upon occurrence of a disturbance in the operation thereof.

In the operation of electric translating systems comprising electric valves, disturbances are occasionally produced therein by failure of the rectifying action of a valve or by failure of a control electrode of a valve to prevent the flow of current therethrough at the proper instant. Such failures generally result in the flow of current of excessive magnitude through the system, whereupon it becomes necessary to interrupt the flow of current by rendering the valves non-conductive, by opening some of the connections of the system, or by a combination of both manners. This result is generally obtained through the agency of means responsive to the magnitude of the flow of current through a part of the system or to the rate of change of a current of the system. A disadvantage of such arrangements is that the current responsive means must be rendered relatively insensitive to prevent undesired operation thereof in response to normal overloads or to sudden changes in the value of the load current. In addiiton, translating systems are frequently so arranged as inherently to limit the abnormal flow of current to values which are of the same order of magnitude as normal overloads, thereby preventing any satisfactory protection by means of overload responsive relays.

The above disadvantages may be obviated by arranging the valves of the translating system in groups normally carrying currents of magnitudes in a predetermined ratio during identical periods and by controlling the operation of the system in response to the occurrence of unbalances between such currents. As the valve currents normally remain balanced regardless of the magnitudes thereof the unbalance responsive means may be made highly sensitive. Upon failure of one of the valves to function properly, the resulting unbalance between the valve currents may therefore initiate the operation of the current interrupting means before the current through any part of the system increases at an abnormal rate or reaches an excessive magnitude.

It is therefore one object of the present invention to provide a protective system for a group of parallel electric valves operable upon flow within the system of abnormal current of lesser magnitude than the normal current thereof.

Another object of the present invention is to provide an improved protective system for a group of parallel electric valves operable upon a predetermined unbalance between the currents flowing through the different valves.

Another object of the present invention is to provide an improved protective system for a group of parallel electric valves operable to interrupt the flow of current through the valves in the shortest possible time in response to occurrence of an abnormal condition of the system.

Figure 2:
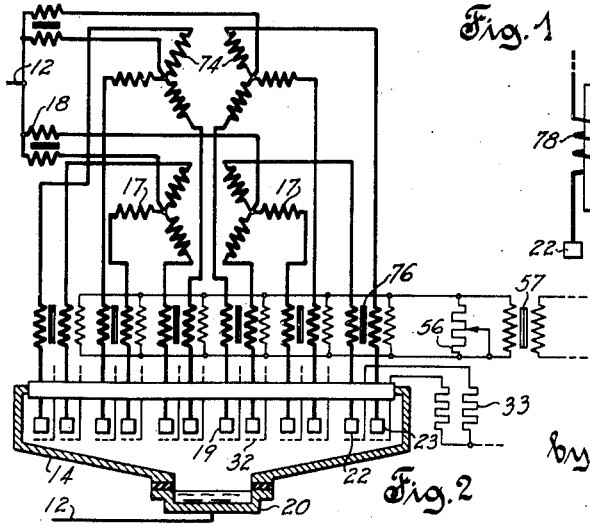
Figure 3:
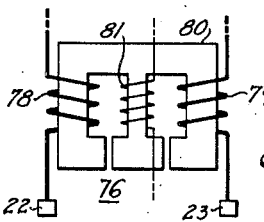
Figure 6:
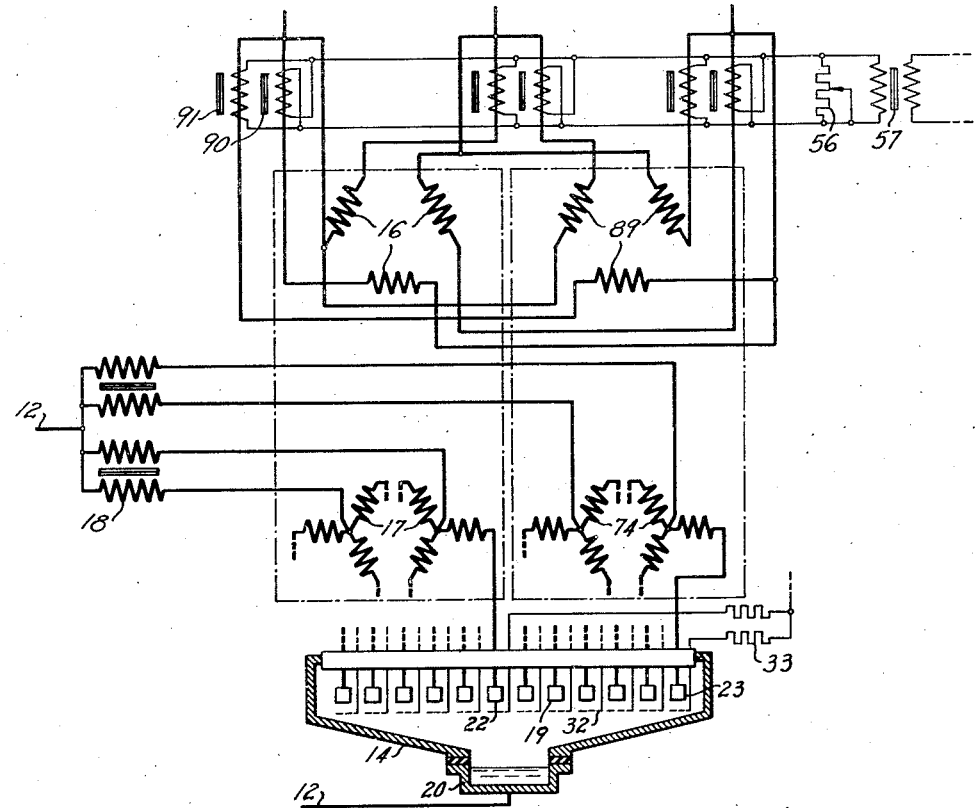
Figure 4:
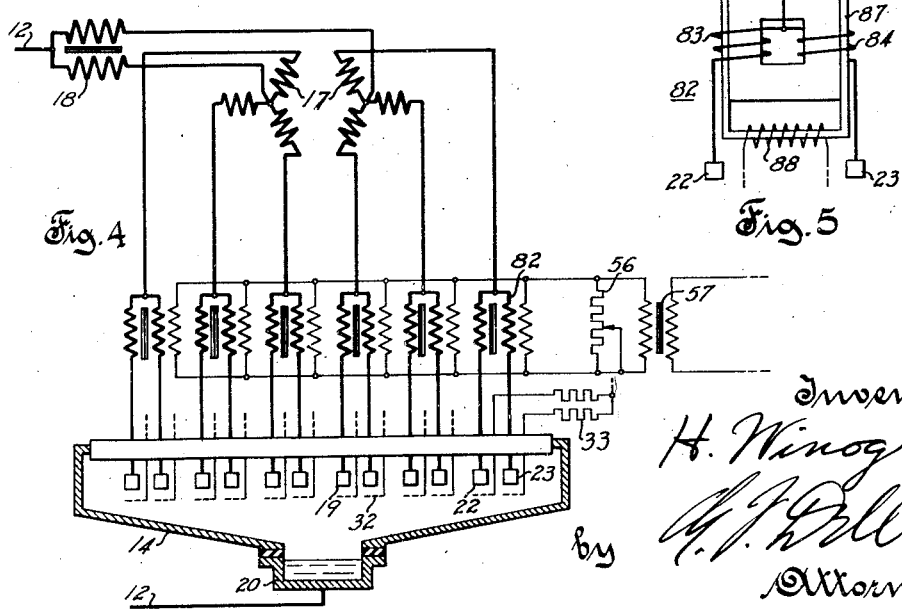
Figure 5:
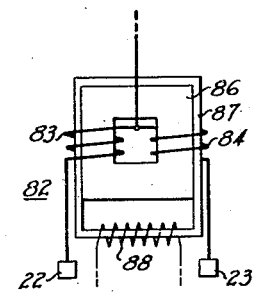
Figure 7:
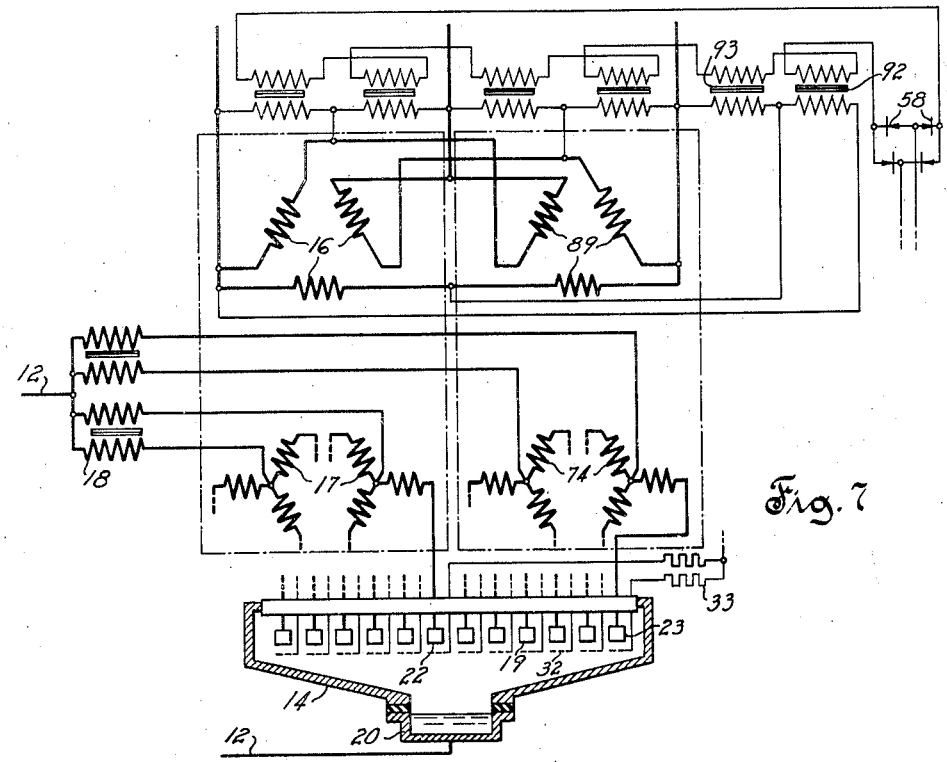
Figure 8:
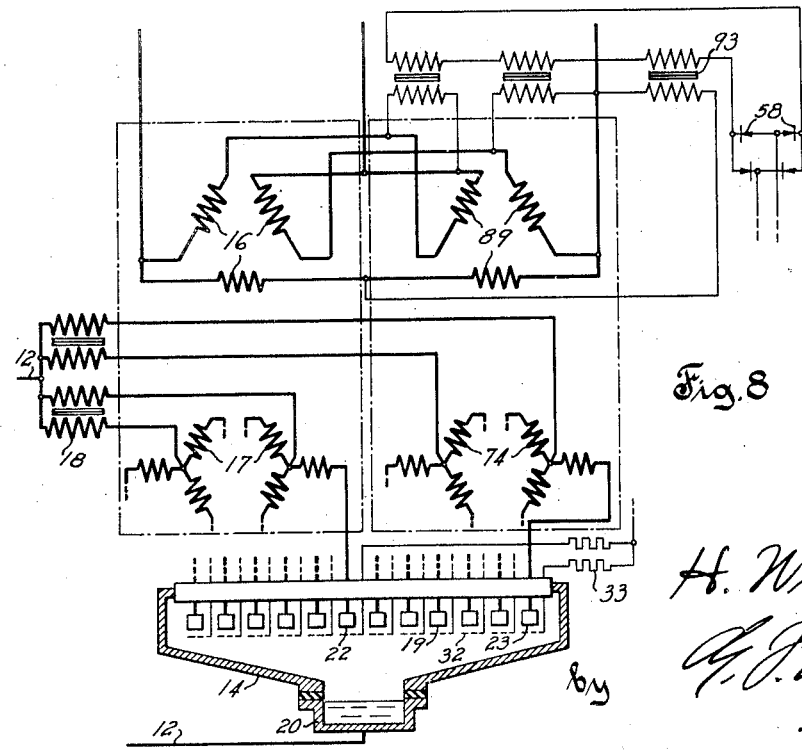

Objects and advantages other than those above set forth will be apparent from the following description when read in connection with the accompanying drawings, in which:

Fig. 1 diagrammatically illustrates one embodiment of the present invention comprising a plurality of groups of parallel valves and current responsive means subjected to the difference between currents proportional to the valve currents;

Fig. 2 diagrammatically illustrates a portion of a modified embodiment of the present invention utilizing current responsive means subjected to currents differentially induced by the valve currents;

Fig. 3 diagrammatically illustrates the arrangement of the differential inductive devices utilized in the embodiment illustrated in Fig. 2;

Fig. 4 diagrammatically illustrates a portion of another modified embodiment of the present invention in which the unbalance responsive means and the paralleling means of a group of valves are combined into a unitary structure;

Fig. 5 diagrammatically illustrates the arrangement of the combined unbalance responsive means and paralleling means of the embodiment illustrated in Fig. 4;

Fig. 6 diagrammatically illustrates a portion of another embodiment of the present invention in which current responsive means are subjected to the difference between currents proportional to the primary currents of transformers supplying current to the valves;

Fig. 7 diagrammatically illustrates a portion of another modified embodiment of the present invention in which current responsive means are differentially subjected to voltages proportional to the primary voltages of the transformers supplying current to the valves; and Fig. 8 diagrammatically illustrates another modified embodiment of the present invention in which current responsive means are subjected to the resultant of some of the voltages of the transformers supplying current to the valves.

Referring more particularly to the drawings by characters of reference, reference numeral 11 designates a polyphase alternating current circuit to be connected with a direct current circuit 12 through a translating system comprising a transformer 13 and a plurality of electric valves generally designated by 14. Transformer 13 may be a unitary structure having all the windings thereof arranged on a common core or may consist of a plurality of single phase transformers. Transformer 13 comprises a primary winding 16 connected with circuit 11 and a secondary winding 17 preferably connected in double star to provide two neutral points connected with one of the conductors of circuit 12 through an interphase transformer 18.

Valves 14 may be of any known type and are represented as being of the vapor type provided with anodes 19. The anodes are preferably arranged within a common casing, the cathodes of the valves then being combined into a common cathode structure 20 connected with the other conductor of circuit 12 through a switch 21. Suitable means (not shown) are provided for bringing cathode 20 into electron emitting condition and for maintaining the cathode in such condition as is well known. Anodes 19 are divided into groups of anodes connected in parallel paths to carry currents of magnitudes in a predetermined ratio during identical periods. The anodes of a group, such as anodes 22, 23 for example, are severally connected with one of the terminals of winding 17 through the primary windings of a group of current transformers such as transformers 25, 26 of a plurality of transformers 24, the windings of a paralleling reactor such as reactor 27, and one of the contacts of a switch 28. The windings of reactor 27 are preferably shunted by surge discharging resistors 29.

Reactor 27 may be so constructed as to cause anodes 22, 23 to carry currents in any desired ratio but for simplifying the explanation of the operation of the system it will be assumed that the reactor normally causes the anodes to carry equal currents. Although each group of anodes is assumed to consist of only two anodes it will be understood that any number of anodes may be connected as a group by means of suitable known paralleling means. The secondary windings of the current transformers of one group are differentially connected in parallel so that the total output current thereof is equal to zero when the currents to the associated anodes or valves are equal. The secondary windings of all current transformers are connected to a common circuit which may be short circuited by one of the contacts of a push button switch 30 of which the other contact serves to connect the closing coil of switch 21 with a suitable source of current such as a battery 31.

The conductivity of valves 14 may be controlled by means of control electrodes 32 severally associated with anodes 19 and each connected with cathode 20 through a suitable control circuit. More particularly, the control electrode associated with the anodes of one group of valves are severally connected, through current limiting resistors such as 33, with one of the secondary winding terminals of a control transformer 34 provided for rendering the valves periodically conductive. Transformer 34 comprises a primary winding 36, a secondary winding 37 and a tertiary winding 38 and may be of any type supplying voltages of sinusoidal or of peaked wave form. Winding 36 is energized from circuit 11 through a plurality of current limiting resistors 39. Winding 37 is connected in star to provide a neutral point connected with cathode 20 through a portion of a voltage divider 40. The voltage divider receives current from circuit 11 through an insulating transformer 41, a group of rectifying devices 42 and a current smoothing reactor 43. A capacitor 44 connected between cathode 20 and the negative terminal of voltage divider 40 cooperates with reactor 43 in reducing the flow of alternating current components through the negative portion of the voltage divider.

The means for interrupting the flow of energy through valves 14 comprise suitable current responsive means such as an electromagnetic relay or, preferably, a pair of auxiliary electric valves 46, 47. The auxiliary valves are preferably of the discontinuously controllable type in which conductive vapor is obtained from a drop of mercury. The cathodes 48, 49 of the auxiliary valves are directly connected with the negative terminal of voltage divider 40. The anode 50 of valve 46 is connected with the neutral point of winding 37 for introducing an additional negative unidirectional voltage in the control circuits associated with all electrodes 32 when valve 46 is rendered conductive. The anode 51 of valve 47 is connected with cathode 49 through a group of rectifying devices 52 connected with winding 38 for operatively short circuiting transformer 34 when valve 47 is rendered conductive.

Valves 46, 47 are rendered conductive in response only to the occurrence of an unbalance between the currents of valves 14 by means of control electrodes 53, 54. For this purpose the common output circuit of current transformers 24 is bridged by an adjusting resistor 56 and is connected with the primary winding of a step-up transformer 57. Transformer 57 supplies current to a group of rectifying devices 58. Control electrodes 53, 54 are connected with cathodes 48, 49 through current limiting resistors 59, 60, rectifying devices 58 and a source of negative potential such as a battery 61. A leakage resistor 62 is connected across rectifying devices 58 to permit dissipation of electric charges having accumulated on control electrodes 53, 54. Capacitors 55 are connected between control electrodes 53, 54 and cathodes 48, 49 to prevent operation of valves 46, 47 in response to transient voltage surges which may appear in the circuits of valves 14. The control electrodes are joined by another capacitor 63 to cause both valves 46 and 47 to operate simultaneously even if one of the control electrodes thereof accidentally becomes disconnected from rectifying devices 58.

Valves 46, 47 may be returned to the inoperative condition by a resetting relay 64. Relay 64 comprises a coil 65 connected across one of the resistors 39 through a resistor 66, and a plurality of slip contacts 67 for short circuiting winding 36. Relay 64 is provided further with a contact 68 for connecting the trip coil of switch 28 with a source of current such as a battery 69, a contact 70 for short circuiting valve 46, a contact 71 for removing a short circuit across a portion of voltage divider 40 and a contact 72 for short circuiting coil 65 through an auxiliary contact 73 of switch 28.

The translating system above described may be utilized for transmitting energy between circuits 11 and 12 in either direction in dependence upon the adjustment of the phase relation between windings 17 and 37. The operation of the system will be described assuming that circuit 11 is a supply circuit and circuit 12 a load circuit, and that the control circuits for control electrodes 32 are adjusted for the flow of energy from circuit 11 to circuit 12. Circuit 11 being energized, transformer 41 energizes voltage divider 40 which impresses on all control electrodes 32 a negative potential component with respect to the potential of cathode 20 to maintain valves 14 non-conductive. Winding 37 of transformer 34 also impresses on the different control electrodes alternating potential components periodically overcoming the potential component impressed thereon by voltage divider 40 to render the valves intermittently conductive.

To place the system in operative condition, switch 28 is first closed to connect winding 17 with anodes 19. Winding 17 thus impresses on the different groups of anodes 19 voltages which bring the groups of anodes sequentially to positive potentials with respect to the potential of cathode 20. Switch 21 may then be closed by momentarily closing push button switch 30. The different groups of valves 14 then transmit current sequentially from winding 17 to circuit 12. Each group of valves, however, only becomes conductive when the control electrodes thereof are imparted a potential which is more positive than substantially the potential of cathode 20 by the joint action of winding 37 and of voltage divider 40. The currents through the different valves of each group are maintained substantially equal by the action of a parallelling reactor such as reactor 27. At the instant of closure of switch 21, however, the initial current impulses through some of the valves may be somewhat unbalanced if the conditions of pressure and temperature are not uniform throughout the valves. Operation of auxiliary valves 46, 47 as a result of unbalances of this nature would be undesired and such operation is prevented by means of push button switch 30, which momentarily short circuits the secondary windings of current transformers 24.

As long as the operation of valves 14 remains free of disturbances, the valve currents remain substantially balanced regardless of the value of such currents even if circuit 12 becomes short circuited. Each valve carries a periodic pulsating current flowing through the primary winding of the associated current transformer 24. This current induces in the current transformer secondary winding an alternating control current proportional thereto. The current transformers of a group of valves, such as transformers 25, 26, are differentially connected with transformer 57 whereby transformer 57 receives the difference between the control currents of the group after push button switch 30 is released. The several groups of secondary windings being connected in parallel, transformer 57 is energized in response to the sum of the several difference currents of the different groups.

During normal operation of the system, the sum of the difference currents is substantially nil and the control currents circulate between the current transformer secondary windings without flowing through transformer 57. The control electrodes of valves 46, 47 are maintained at a negative potential with respect to the potential of the associated cathodes by means of battery 61, and the auxiliary valves therefore remain non-conductive.

The operation of valves 14 may be assumed to be disturbed by a back fire on anode 22, for example, anode 22 becoming electron emitting and functioning as a cathode. All other anodes, except anode 23, thereupon supply current to anode 22, the currents of each group of anodes being balanced and therefore without effect on the operation of the auxiliary valves. Valve 23, however, is then without current and as soon as current begins to flow through anode 22 in a direction reverse of the normal direction of flow, current transformer 25 alone supplies current to transformer 57 as a result of this unbalance between the currents of anodes 22, 23. The secondary voltage of transformer 57 is rectified by rectifying devices 58 and is impressed on control electrodes 53, 54 of the auxiliary valves.

When the unbalance between the currents of anodes 22 and 23 exceeds the predetermined value for which resistor 56 is adjusted, the rectified voltage of transformer 57 overcomes the voltage of battery 61 and brings control electrodes 53, 54 to a positive potential with respect to the potential of cathodes 48, 49. The auxiliary valves thereupon become conductive. Valve 47 receives current from winding 38 through rectifying devices 52 and operatively short circuits winding 38. As a result of the inductive relation between winding 38 and windings 36, 37, the latter windings are thereby likewise operatively short circuited. Substantially the full voltage of circuit 11 then appears across the terminals of resistors 39, which prevent short circuiting of circuit 11 by the operation of valve 47. The short circuit placed on winding 38 is not entirely without resistance and the voltage of winding 38 is therefore not quite reduced to zero. It will be understood, however, that the desired result will be obtained if the resistance of rectifying devices 52 and of the valve 47 is sufficiently low to cause the voltages of transformer 34 to be reduced to a fraction of their normal operating values.

At the same time valve 46 shunts a portion of voltage divider 40, thereby bringing the potential of control electrodes 32 to substantially the potential of the negative terminal of rectifying devices 42. As a result of this action of the auxiliary valves, control electrodes 32 are continuously maintained at a negative potential with respect to the potential of cathode 20 and valves 14 are rendered non-conductive. The flow of current through valves 14 is thereby interrupted and transformers 24 are all deenergized. Control electrodes 53, 54 accordingly return to a negative potential with respect to the potential of cathodes 48, 49, but the auxiliary valves continue to carry current because the voltages impressed thereon are unidirectional.

Upon operation of valve 47, substantially the full voltage of circuit 11 is impressed on resistor 66 and coil 65, thereby causing relay 64 to operate. Relay 64 first closes slip contacts 67 which short circuit winding 36. Transformer 34 is thereby rendered inoperative and ceases to supply current to valve 47, which is thereupon rendered non-conductive by control electrode 54. Relay 64 thereafter closes contacts 68 to 72. Contact 70 short circuits valve 46 to stop the flow of current through the valve and permit control electrode 53 thereof to render valve 46 non-conductive. Contact 71 removes a short circuit across a portion of voltage divider 40 to reduce the flow of current through the voltage divider.

Contact 68 completes the tripping circuit of switch 28 to cause switch 28 to open. The switch interrupts any current that may have continued to flow through valves 14 as a result of improper operation of any of control electrodes 32. Contact 72 short circuits coil 65 through contact 73 to cause relay 64 to return to the position shown. The system may then again be placed in operation by reclosing switch 28.

In the embodiment partially illustrated in Fig. 2, the paralleling devices for anodes 19 are omitted, only one-half of the anodes being connected with winding 17. The remainder of the anodes are connected with another winding 74 of the supply transformer identical with winding 17. The anodes of a group, such as anodes 22, 23, are connected with phase portions of windings 17, 74 in phase coincidence. The no-load voltages and the impedances of such phase portions are made equal to cause equal distribution of current between parallel anodes as in the embodiment illustrated in Fig. 1. Current transformers 24 are replaced by current transformers such as current transformer 76, connected with anodes 22, 23. As illustrated in detail in Fig. 3, current transformer 76 comprises a pair of primary windings 78, 79 mounted on the outer legs of a three legged core 80. The middle leg of the core carries the single secondary winding 81 of the transformer. Core 80 may be provided with air gaps to prevent saturation thereof by the valve currents flowing through windings 78, 79.

Windings 78, 79 are so wound as to impress additive magnetomotive forces on core 80 with the exception of the middle leg thereof, which is subjected to the differential action of windings 78, 79. When anodes 22, 23 carry substantially equal pulsating currents during identical periods, windings 78, 79 induce a common magnetic flux through the outer legs and through the yokes of core 80, but no flux is flowing through the middle leg of the core. Upon occurrence of an unbalance between the currents flowing through anodes 22, 23, windings 78, 79 induce a pulsating magnetic flux in the middle leg of core 80. This flux in turn induces in winding 81 a control current proportional to the difference between the currents flowing through anodes 22, 23. The current of winding 81 is equal to the difference between the output currents of current transformers 25, 26 of the embodiment illustrated in Fig. 1 and serves in the same manner to control operation of the auxiliary valves 46, 47. The operation of the system accordingly continues thereafter in the manner above described with respect to the embodiment illustrated in Fig. 1.

In the embodiment illustrated in Fig. 4 all the anodes 19 are connected with winding 17 through paralleling reactors such as reactor 82. As illustrated in detail in Fig. 5, reactor 82 is provided with a pair of primary windings 83, 84 severally connected with anodes 22, 23 and arranged on a two legged core comprising two portions 86, 87. Windings 83, 84 act differentially on cores 86, 87 in which they do not induce any magnetic flux when the anode currents are balanced and flow during identical periods. Any unbalance between the anode currents causes the flow of a large magnetic flux through core 86. Under normal operating conditions this flux induces paralleling voltages in windings 83, 84 which restore the equality between the currents flowing therethrough. Core 87 is provided with a secondary winding 88 functioning in the same manner as winding 81 of the embodiment illustrated in Figs. 2 and 3. The dimensions of cores 86, 87 are so chosen as to enable the cores to perform their respective functions, but the cross-sections of the two cores need not be in any particular relation.

In the embodiment illustrated in Fig. 6, anodes 19 are supplied with current from windings 17 and 74 as in the embodiment illustrated in Fig. 2. In the present embodiment, however, windings 17 and 74 are severally associated with two separate primary windings 16 and 89 connected in parallel. Windings 89, 74 may be arranged on a core distinct from the core receiving windings 16 and 17 or else all four windings may be arranged on a common core as is well known. Each phase portion of windings 16, 89 is connected in series with a current transformer and all the current transformer secondary windings are connected with the primary winding of transformer 57. The current transformers such as 90, 91 associated with parallel phase portions of windings 16, 89 inducing currents through parallel anodes such as anodes 22, 23 have their secondary windings differentially connected with transformer 57. The currents flowing through the phase portions of windings 16, 89 being proportional to the anode currents, transformer 57 receives current from the current transformers only when the anode currents become unbalanced as in the embodiment illustrated in Fig. 1.

In the embodiment illustrated in Fig. 7, the corresponding phase portions of windings 16, 89 are connected in series, the serially connected phase portions being associated with secondary phase portions operating in parallel. Windings 89, 74 may again be arranged on a core different from the core associated with windings 16, 17. The alternate arrangement of all windings on a common core may also be used to form a system of the type disclosed and claimed in U. S. Patent 2,127,232, Nichols, August 16, 1938. Each phase portion of windings 16, 89 is bridged by the primary winding of a potential transformer. The secondary windings of a group of these potential transformers, such as 92, 93, associated with serially connected phase portions of windings 16, 89 are connected in opposition and the groups of secondary windings are connected in series to the input terminals of rectifying devices 58.

When the anodes 19 carry balanced currents, the voltage distribution between series connected phase portions of windings 16, 89 is uniform. The potential transformers then do not impress any voltage on rectifying devices 58 because of the differential connection of the potential transformer secondary windings. Upon occurrence of an unbalance between the currents through anodes 22, 23 for example, the inductive voltage drops in the associated phase portions of windings 16, 89 assume different values, thereby rendering the voltage distribution between such phase portions non-uniform. The secondary voltages of transformers 92, 93 then are no longer equal and the difference therebetween is impressed on rectifying devices 58. The rectified difference voltage is impressed on the control electrodes of auxiliary valves 46, 47 as in the embodiment illustrated in Fig. 1 with the result that the system functions as above described.

The embodiment illustrated in Fig. 8 differs from the embodiment illustrated in Fig. 7 in that the potential transformers connected across the phase portions of winding 16 are omitted. The secondary windings of the remaining potential transformers are connected in series to the terminals of rectifying devices 58. During normal operation of valves 14 the voltages appearing across the phase portions of winding 89 form a substantially balanced three phase system of voltages. The sum of the voltages is substantially equal to zero at every instant and the voltages impressed by the potential transformers on rectifying devices 58 likewise add up to zero.

Upon occurrence of an unbalance between the currents flowing through anodes 22, 23 for example, the voltage distribution between the phase portions of windings 16, 89 associated therewith becomes non-uniform. The voltage distribution between the remaining phase portions of windings 16, 89, however, remains uniform. The voltages of the phase portions of winding 89 accordingly become unbalanced and a voltage proportional to the resultant of such voltages is impressed on rectifying devices 58 to cause operation of auxiliary valves 46, 47 in the manner above described.

Although but a few embodiments of the present invention have been illustrated and described, it will be apparent to those skilled in the art that various changes and modifications may be made therein without departing from the spirit of the invention or from the scope of the appended claims.

It is claimed and desired to secure by Letters Patent:

1. In an electric translating system, a supply circuit, a load circuit, means connecting said circuits for the flow of energy therebetween comprising a plurality of electric valves connected in parallel paths to carry currents of magnitudes in a predetermined ratio during identical periods, and means for interrupting said flow of energy comprising means responsive only to the occurrence of an unbalance between said currents.

2. In an electric translating system, a supply circuit, a load circuit, means connecting said circuits for the flow of energy therebetween comprising a plurality of electric valves connected in parallel paths to carry currents of magnitudes in a predetermined ratio during identical periods, and means for rendering said valves non-conductive comprising means responsive only to the occurrence of an unbalance between said currents.

3. In an electric translating system, a supply circuit, a load circuit, means connecting said circuits for the flow of energy therebetween comprising a plurality of electric valves connected in parallel paths to carry currents of magnitudes in a predetermined ratio during identical periods, and means for rendering said valves non-conductive comprising means responsive to the difference between currents proportional to the magnitudes of the first said currents.

4. In an electric translating system, a supply circuit, a load circuit, means connecting said circuits for the flow of energy therebetween comprising a plurality of electric valves connected in parallel paths to carry equal currents during identical periods, and means for rendering said valves non-conductive comprising means responsive to the difference between the magnitudes of said currents.

5. In an electric translating system, a supply circuit, a load circuit, means connecting said circuits for the flow of energy therebetween comprising a plurality of electric valves connected in parallel paths to carry currents of magnitudes in a predetermined ratio during identical periods, and means for rendering said valves non-conductive comprising means for producing control currents proportional to the magnitudes of the first said currents and means responsive to the difference between said control currents.

6. In an electric translating system, a supply circuit, a load circuit, means connecting said circuits for the flow of energy therebetween comprising a plurality of groups of electric valves, the valves of each group being connected in parallel paths to carry currents of magnitudes in a predetermined ratio during identical periods, and means for rendering said valves non-conductive comprising means responsive only to the occurrence of an unbalance between the currents of any one of said groups of valves.

7. In an electric translating system, a supply circuit, a load circuit, means connecting said circuits for the flow of energy therebetween comprising a plurality of groups of electric valves, the valves of each group being connected in parallel paths to carry currents of magnitudes in a predetermined ratio during identical periods, and means for rendering said valves non-conductive comprising means for producing control currents proportional to the first said currents, means for obtaining the difference between the control currents of each group of valves, and means responsive to the sum of the several said difference currents.

8. In an electric translating system, a supply circuit, a load circuit, means connecting said circuits for the flow of energy therebetween comprising a plurality of electric valves connected in parallel paths to carry currents of magnitudes in a predetermined ratio during identical periods, and means for rendering said valves non-conductive comprising current responsive means and current transformers having their primary windings severally connected in series with the different said valves and their secondary windings differentially connected with said current responsive means.

9. In an electric translating system, a supply circuit, a load circuit, means connecting said circuits for the flow of energy therebetween comprising a plurality of electric valves connected in parallel paths to carry currents of magnitudes in a predetermined ratio during identical periods, and means for rendering said valves non-conductive comprising current responsive means and a current transformer, said current transformer comprising a secondary winding connected with said current responsive means and primary windings severally connected in series with said valves and acting differentially on said secondary winding.

10. In an electric translating system, a supply circuit, a load circuit, means connecting said circuits for the flow of energy therebetween comprising a plurality of electric valves connected in parallel paths, reactor means comprising a magnetic core and a plurality of primary windings severally connected in series with the different said valves and acting differentially on the entire said core for causing the currents through said valves to assume magnitudes in a predetermined ratio, and means for rendering said valves non-conductive comprising a secondary winding wound on a portion of said core to be subjected to the differential action of said primary windings and current responsive means connected with said secondary winding.

11. In an electric translating system, a supply circuit, a load circuit, means connecting said circuits for the flow of energy therebetween including transformer means comprising a plurality of serially connected primary windings severally associated with a plurality of secondary windings, a plurality of electric valves connected in parallel paths each comprising one of said valves and one of said secondary windings to cause said valves to carry currents of magnitudes in a predetermined ratio during identical periods, and means for rendering said valves non-conductive in response to the occurrence of an unbalance between said currents including current responsive means and a plurality of potential transformers having their primary windings severally connected across the first said primary windings and having their secondary windings differentially connected with said current responsive means.

12. In an electric translating system, a supply circuit, a load circuit, means connecting said circuits for the flow of energy therebetween including transformer means comprising a plurality of parallel primary windings severally associated with a plurality of secondary windings, a plurality of electric valves connected in parallel paths each comprising one of said valves and one of said secondary windings to cause said valves to carry currents of magnitudes in a predetermined ratio during identical periods, and means for rendering said valves non-conductive in response to the occurrence of an unbalance between said currents including current responsive means and a plurality of current transformers having their primary windings severally connected in series with the different first said primary windings and their secondary windings differentially connected to said current responsive means.

13. In an electric translating system, an electric valve having an anode, a control electrode and a cathode, a control circuit connecting said control electrode with said cathode, a source of alternating current, a transformer comprising a primary winding connected with said source, a secondary winding connected with said control circuit to cause said valve to become periodically conductive, and a tertiary winding, and means for rendering said valve non-conductive comprising means responsive to an operating condition of said valve for operatively short circuiting said tertiary winding.

14. In an electric translating system, a supply circuit, a load circuit, means connecting said circuits for the flow of energy therebetween comprising a plurality of electric valves connected in parallel paths to carry currents of magnitudes in a predetermined ratio during identical periods, each of said valves having an anode, a control electrode and a cathode, control circuits connecting said control electrodes with said cathodes, a source of alternating current, a transformer comprising a primary winding connected with said source, a secondary winding connected with said control circuits for rendering said valves periodically conductive, and a tertiary winding, and means for rendering said valves nonconductive comprising means responsive only to the occurrence of an unbalance between said currents for operatively short circuiting said tertiary winding.

15. In an electric translating system, a supply circuit, a load circuit, means connecting said circuits for the flow of energy therebetween comprising a plurality of electric valves connected in parallel paths to carry currents of magnitudes in a predetermined ratio during identical periods, each of said valves having an anode, a control electrode and a cathode, control circuits connecting said control electrodes with said cathodes, a source of alternating current, a transformer comprising a primary winding connected with said source and a secondary winding connected with said control circuits for rendering said valves periodically conductive, and means for rendering said valves non-conductive comprising means responsive only to the occurrence of an unbalance between said currents for operatively short circuiting said transformer.

16. In an electric translating system, a supply circuit, a load circuit, means connecting said circuits for the flow of energy therebetween comprising a plurality of electric valves connected in parallel paths to carry currents of magnitudes in a predetermined ratio during identical periods, each of said valves having an anode, a control electrode and a cathode, control circuits connecting said control electrodes with said cathodes, a source of alternating current, a transformer comprising a primary winding connected with said source and a secondary winding connected with said control circuits for rendering said valves periodically conductive, and means for rendering said valves nonconductive comprising means responsive only to the occurrence of an unbalance between said currents for operatively short circuiting said transformer and for introducing a negative unidirectional voltage component in said control circuits.

17. In an electric translating system, a supply circuit, a load circuit, means connecting said circuits for the flow of energy therebetween comprising a plurality of electric valves connected in parallel paths to carry currents of magnitudes in a predetermined ratio during identical periods, each of said valves having an anode, a control electrode and a cathode, control circuits connecting said control electrodes with said cathode, a source of alternating current, a transformer comprising a primary winding connected with said source and a secondary winding connected with said control circuits for rendering said valves periodically conductive, and means for rendering said valves nonconductive comprising an auxiliary electric valve for operatively short circuiting said transformer and means responsive only to the occurrence of an unbalance between said currents for rendering said auxiliary valve conductive.

18. In an electric translating system, a supply circuit, a load circuit, means connecting said circuits for the flow of energy therebetween comprising a switch and a plurality of electric valves connected in parallel paths to carry currents of magnitudes in a predetermined ratio during identical periods, means for interrupting said flow of energy comprising means responsive only to the occurrence of an unbalance between said currents, and means for momentarily rendering said interrupting means ineffective during and immediately after closure of said switch.

19. In an electric translating system, a supply circuit, a load circuit, means connecting said circuits for the flow of current therebetween comprising a plurality of electric valves connected in parallel paths to carry currents of magnitudes in a predetermined ratio during identical periods, means for controlling the conductivity of said valves, and means for rendering said valves non-conductive comprising means responsive only to the occurrence of an unbalance between said currents for controlling said conductivity controlling means.

HAROLD WINOGRAD.